(12) United States Patent
Takahashi et al.

(10) Patent No.: US 12,730,860 B2
(45) Date of Patent: Sep. 8, 2026

(54) MOBILE DRIVER'S LICENSE ISSUING APPARATUS, MOBILE DRIVER'S LICENSE ISSUING METHOD, AND COMPUTER-READABLE RECORDING MEDIUM

(71) Applicant: NEC Corporation, Tokyo (JP)

(72) Inventors: Nobuhisa Takahashi, Tokyo (JP); Kousuke Yoshida, Tokyo (JP); Hiroshi Fukuda, Tokyo (JP); Yoshinori Saida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 23 days.

(21) Appl. No.: 18/838,657

(22) PCT Filed: Mar. 10, 2022

(86) PCT No.: PCT/JP2022/010495

§ 371 (c)(1),
(2) Date: Aug. 15, 2024

(87) PCT Pub. No.: WO2023/170850

PCT Pub. Date: Sep. 14, 2023

(65) Prior Publication Data

US 2025/0225208 A1 Jul. 10, 2025

(51) Int. Cl.
*G06F 21/10* (2013.01)
*G06F 21/32* (2013.01)

(52) U.S. Cl.
CPC ...... *G06F 21/1011* (2023.08); *G06F 21/1076* (2023.08); *G06F 21/32* (2013.01)

(58) Field of Classification Search
USPC .......................................................... 713/193
See application file for complete search history.

(56) References Cited

U.S. PATENT DOCUMENTS 10,482,226 B1 * 11/2019 Konrardy ................ B60R 25/04
2021/0089640 A1 * 3/2021 DeRosa-Grund ....... G06F 18/25
2022/0027442 A1 * 1/2022 Militello ................ G06F 21/34

FOREIGN PATENT DOCUMENTS

AU 2020103160 A4 * 1/2021 ............... G06N 7/01
CN 106599661 A * 4/2017 ............ G06F 21/32
(Continued)

OTHER PUBLICATIONS

International Search Report for PCT Application No. PCT/JP2022/010495, mailed on May 24, 2022.
(Continued)

*Primary Examiner* — Sakinah White-Taylor
(74) *Attorney, Agent, or Firm* — Sughrue Mion, PLLC

(57) ABSTRACT

A mobile driver's license issuing apparatus comprising: confirming unit that combis, based on combination information set in advance, first biometric information of an applicant that has been stored in advance in a driver's license information storage device connected to a dedicated line, second biometric information acquired by real-time image capture of the applicant, and third biometric information of the applicant held by an integrated circuit (IC)-based driver's license owned by the applicant, and for executing an identity verification process on each combination; and issuing unit that issues, when identity verification has succeeded, mobile driver's license information, which has been generated based on driver's license information of the applicant acquired from the driver's license information storage device, to a terminal owned by the applicant so as to store the mobile driver's license information in a storage area of the terminal.

12 Claims, 5 Drawing Sheets

(56) References Cited

FOREIGN PATENT DOCUMENTS

| | | | |
|---|---|---|---|
| JP | 2004-013761 | A | 1/2004 |
| JP | 2004-318409 | A | 11/2004 |
| JP | 2009-151654 | A | 7/2009 |
| JP | 2019-153906 | A | 9/2019 |
| WO | 2021/214975 | A1 | 10/2021 |

OTHER PUBLICATIONS

Written Opinion of the International Searching Authority (PCT/ISA/237) for PCT Application No. PCT/JP2022/010495, mailed on Sep. 19, 2024.

English translation of PCT/ISA/237 for PCT Application No. PCT/JP2022/010495, mailed on Sep. 19, 2024.

* cited by examiner

Fig. 1

| VARIOUS TYPES OF PROCEDURE | EXISTING TASKS | | mDL TASKS | |
|---|---|---|---|---|
| | BEFORE THE ROCEDURES | AFTER THE PROCEDURES | BEFORE THE ROCEDURES | AFTER THE PROCEDURES |
| ISSUING A NEW LICENSE | License: Not owned | ISSUANCE OF A NEW LICENSE | mDL: Not owned | ISSUANCE OF A NEW mDL |
| RECORDING ADDITIONAL INFORMATION | License: Owned | CREATION OF A NEW LICENSE<br>DESTRUCTION OF THE OLD LICENSE | mDL: Owned | UPDATE mDL |
| RENEWAL | License: Owned | CREATION OF A NEW LICENSE<br>DESTRUCTION OF THE OLD LICENSE | mDL: Owned | UPDATE mDL |
| REISSUING | License: Not owned (lost) | CREATION OF A NEW LICENSE<br>INVALIDATION OF THE OLD LICENSE | mDL: Not owned (lost) | ISSUANCE OF NEW mDL<br>UPDATE OLD mDL |
| REISSUING FOLLOWING REVOCATION | License: Owned | CREATION OF A NEW LICENSE<br>DESTRUCTION OF THE OLD LICENSE | mDL: Owned | UPDATE mDL |
| CHANGES TO CONTENT | License: Owned | ADDITION TO THE LICENSE | mDL: Owned | UPDATE mDL |
| SURRENDERING OF LICENSE | License: Owned | ISSUANCE OF NEW CERTIFICATE OF PERSONAL HISTORY<br>DESTRUCTION OF THE OLD LICENSE | mDL: Owned | ISSUANCE OF NEW CERTIFICATE OF PERSONAL HISTORY<br>REVOCATION OF mDL |
| ISSUING AN INTERNATIONAL LICENSE | - | - | - | - |
| SWITCHOVER OF FOREIGN LICENSE | License: Not owned | ISSUANCE OF A NEW LICENSE | mDL: Not owned | ISSUANCE OF A NEW mDL |
| ADMINISTRATIVE PENALTY | License: Owned | SUSPENSION OR REVOCATION OF LICENSE | mDL: Owned | SUSPENSION OR REVOCATION OF mDL |

Fig. 2
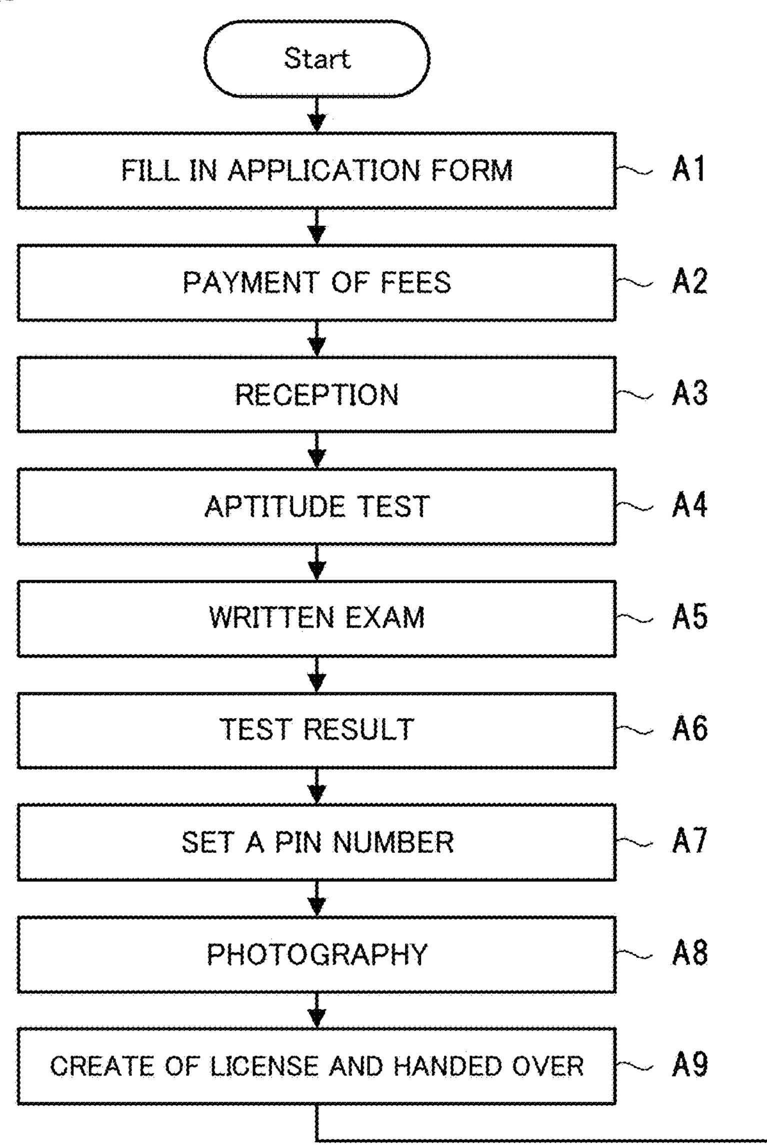
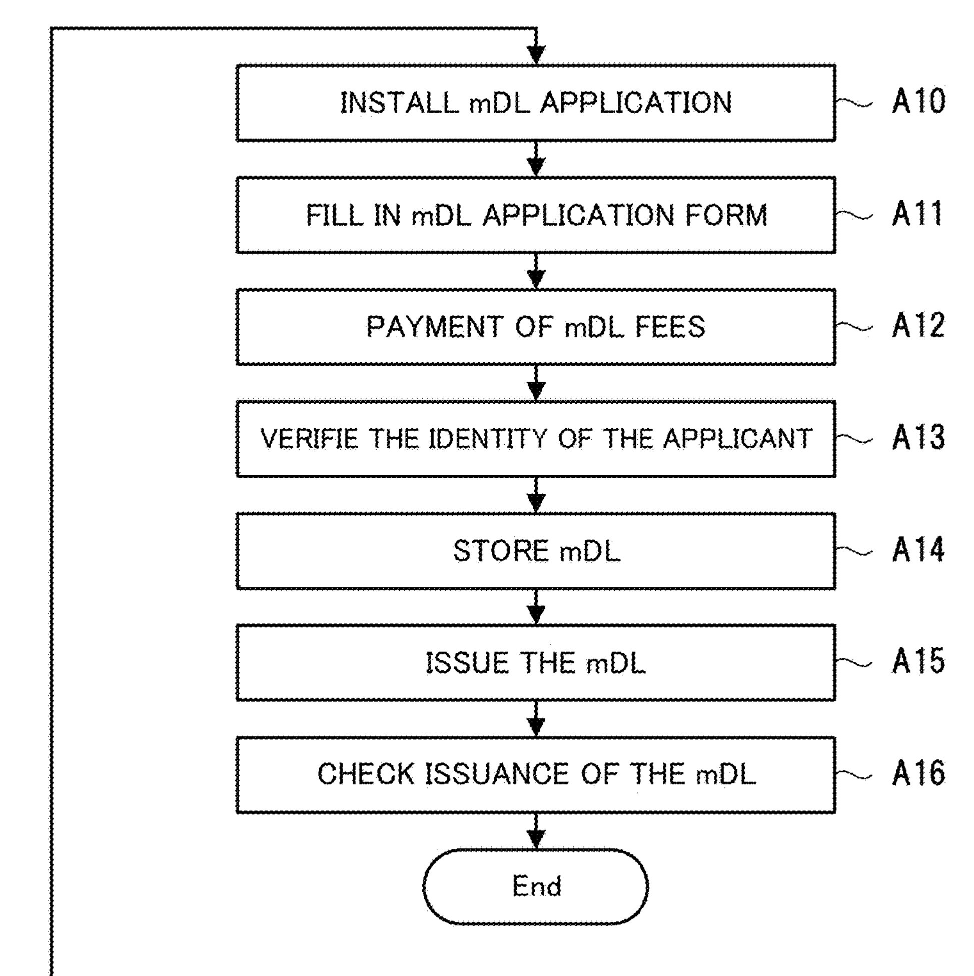

MOBILE DRIVER'S LICENSE ISSUING APPARATUS, MOBILE DRIVER'S LICENSE ISSUING METHOD, AND COMPUTER-READABLE RECORDING MEDIUM

This application is a National Stage Entry of PCT/JP2022/010495 filed on Mar. 10, 2022, the contents of all of which are incorporated herein by reference, in their entirety.

TECHNICAL FIELD

The technical field of the present application relates to a mobile driver's license issuing apparatus and a mobile driver's license issuing method that issue mobile driver's licenses, and additionally to a computer-readable recording medium on which a program for realizing this apparatus and method is recorded

BACKGROUND ART

The International Standard ISO 18013-5 has been established for Mobile Driver's licenses (mDL) and is expected to be introduced into Japan too. This international standard, however, does not clearly define a method for issuing an mDL to the mobile device of an applicant. This makes it necessary to investigate operational procedures for issuing a license.

As a related technology, Patent Document 1 discloses a mobile driver's license system that ensures whether updating information for driver's license information is valid. In the mobile driver's license system according to Patent Document 1, a mobile device adds an updating information mobile signature to updating information for driver's license information to validate the updating information for the driver's license information.

LIST OF RELATED ART DOCUMENTS

Patent Document

Patent document 1: Japanese Patent Laid-Open Publication No. 2019-153906

SUMMARY OF INVENTION

Problems to be Solved by the Invention

Once mDL are introduced, there will be a gradual move away from conventional driver's licenses. However, it is assumed that in an initial period following the introduction of mDL, applicants will have both a conventional driver's license and an mDL. This means that issuing an mDL will comprise an additional task on top of the task of issuing a conventional driver's license, and therefore create an additional burden on staff involved in the issuing driver's licenses.

An example object of the invention is to provide a mobile driver's license issuing apparatus, a mobile driver's license issuing method, and a computer readable recording medium that reduce the burden placed on staff relating to the issuing of driver's licenses.

Means for Solving the Problems

In order to achieve the example object described above, a mobile driver's license issuing apparatus according to an example aspect includes:

confirming unit that combine, based on combination information set in advance, first biometric information of an applicant that has been stored in advance in a driver's license information storage device connected to a dedicated line, second biometric information acquired by real-time image capture of the applicant, and third biometric information of the applicant held by an integrated circuit (IC)-based driver's license owned by the applicant, and for executing an identity verification process on each combination; and issuing unit that issue, when identity verification has succeeded, mobile driver's license information, which has been generated based on driver's license information of the applicant acquired from the driver's license information storage device, to a terminal owned by the applicant so as to store the mobile driver's license information in a storage area of the terminal.

Also, in order to achieve the example object described above, a mobile driver's license issuing method that is performed by a computer according to an example aspect includes:

combining, based on combination information set in advance, first biometric information of an applicant that has been stored in advance in a driver's license information storage device connected to a dedicated line, second biometric information acquired by real-time image capture of the applicant, and third biometric information of the applicant held by an integrated circuit (IC)-based driver's license owned by the applicant, and executing an identity verification process on each combination; and issuing, when identity verification has succeeded, mobile driver's license information, which has been generated based on driver's license information of the applicant acquired from the driver's license information storage device, to a terminal owned by the applicant so as to store the mobile driver's license information in a storage area of the terminal.

Furthermore, in order to achieve the example object described above, a computer-readable recording medium according to an example aspect includes a program recorded on the computer-readable recording medium, the program including instructions that cause the computer to carry out:

combining, based on combination information set in advance, first biometric information of an applicant that has been stored in advance in a driver's license information storage device connected to a dedicated line, second biometric information acquired by real-time image capture of the applicant, and third biometric information of the applicant held by an integrated circuit (IC)-based driver's license owned by the applicant, and executing an identity verification process on each combination; and issuing, when identity verification has succeeded, mobile driver's license information, which has been generated based on driver's license information of the applicant acquired from the driver's license information storage device, to a terminal owned by the applicant so as to store the mobile driver's license information in a storage area of the terminal.

Advantageous Effects of the Invention

According to one aspect of the invention, it is possible to reduce the burden placed on staff relating to the issuing of driver's licenses.

BRIEF DESCRIPTION OF THE DRAWINGS

FIG. 1 is a diagram illustrating an example of the likely tasks involved in issuing a driver's license.

FIG. 2 is a diagram illustrating an example of procedure when a driver's license is newly issued.

EXAMPLE EMBODIMENT

Figure 3:
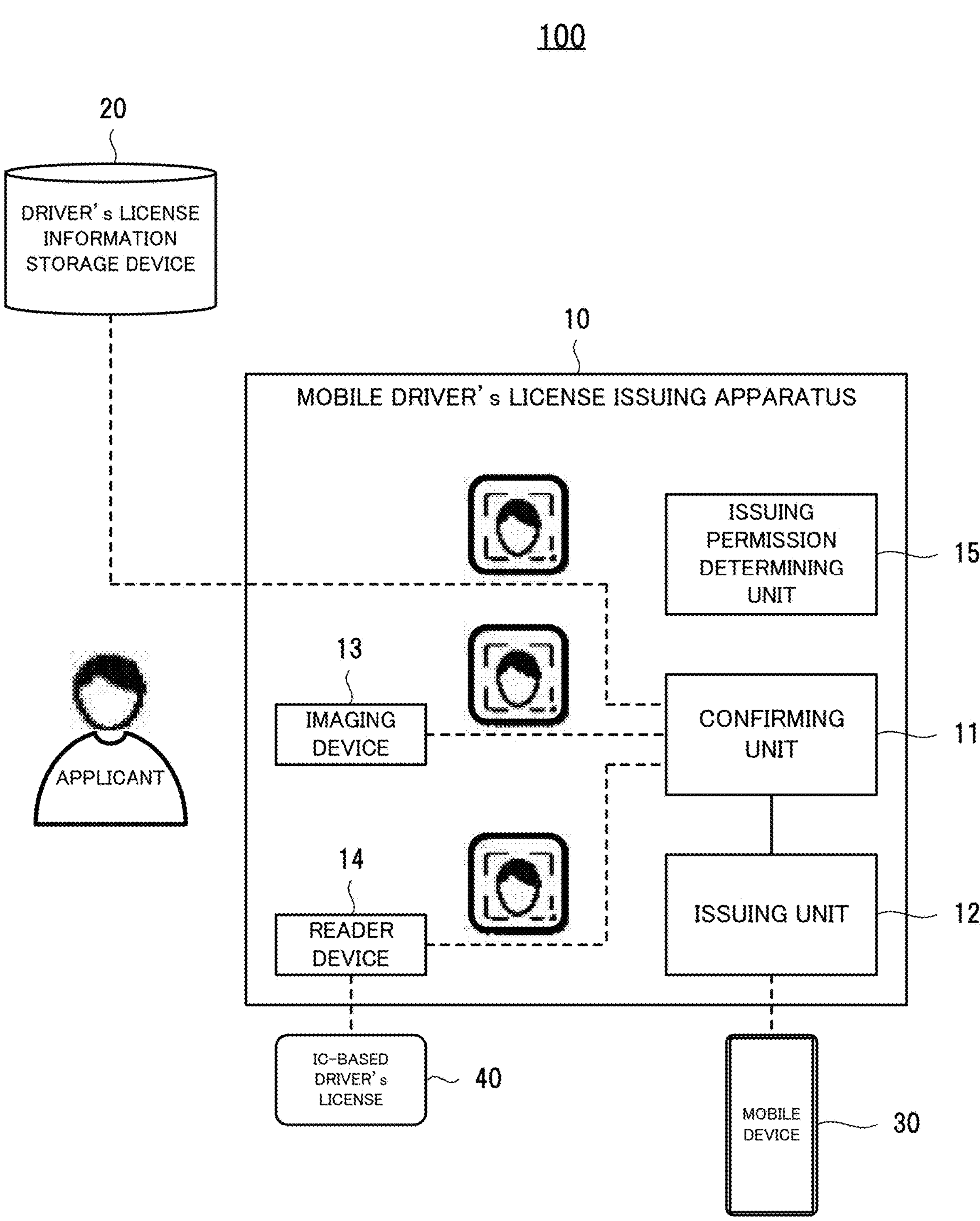
FIG. 3 is a diagram illustrating an example of a system including a mobile driver's license issuing apparatus.

First, an overview will be given to facilitate understanding of example embodiments described below.

A mobile Driver's License (or "mDL") is a driver's license issued by a public authority. As one example, an mDL is a driver's license that is equivalent to an International Driving Permit that complies with international standards.

When an mDL is issued by the Japanese police for example, the tasks indicated in FIG. 1 are likely to be performed. FIG. 1 is a diagram useful in explaining the likely tasks involved in issuing a driver's license.

When mDLs have been introduced, it is expected that applicants will have an mDL in addition to an IC (integrated chip)-based driver's license for some time following the introduction of mDLs. For this reason, as depicted in FIG. 1, it is expected that mDL-related tasks will exist alongside existing tasks for various types of procedure, as examples, "issuing a new license", "recording additional information", "renewal", "reissuing", "reissuing following revocation", "changes to content", "surrendering of license", "issuing an international license", "switchover of foreign license", and "administrative penalty".

The expression "existing tasks" refers here to tasks when performing a procedure that issues an existing IC-based driver's license, for example. The expression "mDL tasks" refers to tasks when performing a procedure that issues an mDL.

Since it is assumed that IC driver's licenses will be gradually replaced by mDL, it is believed that "existing tasks" will gradually decrease. However, until the IC driver's licenses are replaced with mDL, it will be necessary to perform mDL tasks in addition to existing tasks, which means that the burden placed on staff involved in issuing driver's licenses will increase.

Consider an example where a driver's license is newly issued. FIG. 2 is a diagram useful in explaining an example procedure when a driver's license is newly issued.

In FIG. 2, steps A1 to A9 indicate an example procedure for newly issuing a conventional IC-based driver's license, and steps A10 to A16 indicate one example of the expected procedure when newly issuing an mDL.

When an IC-based driver's license is newly issued, the applicant first fills in the necessary information on an application form (Step A1), pays a fee (Step A2), performs a reception procedure at a counter (Step A3), takes an aptitude test (Step A4), and sits a written exam (Step A5).

Next, the applicant checks the test results (Step A6), and if the applicant has passed, sets a personal identification number (PIN) (Step A7). After this, the applicant is photographed (step A8), an IC-based driver's license (a physical card) is created, and handed over to the applicant (step A9).

In step A9, before the IC-based driver's license is handed over, the staff member uses a terminal device to store driver's license information of the applicant in a driver's license information storage device (or "database"). Driver's license information is information in which a driver's license number issued to the driver's license holder, personal information required to obtain a driver's license, and validity information are associated.

As examples, the personal information includes information representing a facial photo, a name, a date of birth, an address, and a license type. The validity information includes expiry date information indicating the expiry date of the driver's license, revocation information indicating whether the driver's license has currently been revoked, and the like.

This means that when an IC-based driver's license is newly issued, existing tasks are generated corresponding to the procedures shown in steps A1 to A9.

Next, consider the case when an mDL is newly issued. When applying for an mDL, the applicant first installs an mDL application (step A10).

The expression "mDL application" refers to an application that is installed in a mobile device and is used when using an mDL. As examples, this mDL application is launched and used when it is necessary to check the holder's driver's license during traffic enforcement, for identity verification at a pharmacy, and for age verification when entering a bar or a store.

Next, the applicant enters the necessary information into a form on the mDL application (step A11) and pays the mDL application fee to staff at a counter (step A12). When no application fee is required, the procedure in Step A12 is unnecessary.

Next, the staff member visually verifies the identity of the applicant (step A13), and when the applicant's identity has been successfully verified, the staff member is permitted to issue an mDL to the applicant. After obtaining this permission, the staff member uses a terminal device to register mDL application completion information and mDL permission confirmation information in association with the driver's license information of the applicant that is stored in a driver's license information storage device (step A14).

The mDL application completion information is information indicating whether the application procedure that is necessary before an mDL can be issued has been completed. The mDL permission confirmation information is information indicating that permission to issue an mDL has been confirmed.

Next, when the registration of the mDL application completion information and the mDL permission confirmation information has been completed, the staff member uses the terminal device to issue an mDL to a mobile device of the applicant (step A15). In other words, mobile driver's license information (or "mDL information") is stored in a storage area of the mobile terminal.

To issue the mDL, as one example, the staff member uses the terminal device to issue information, such as mDL information of the applicant and signature information, stored (registered) in the driver's license information storage device, to the mobile device of the applicant terminal and store (register) the information in the mobile device. Note that as one example, encrypted information based on driver's license information may be used as the mDL information.

As one example, mobile driver's license information (or "mDL information") is information that is equivalent to the driver's license information stored in the IC chip of an IC-based driver's license, and is information that conforms to International Standard ISO 18013-5.

After this, the applicant uses his/her mobile device to check whether an mDL has been issued (step A16).

When an mDL is newly issued in this way, it is assumed that mDL tasks will be generated for a staff member corresponding to the procedures depicted in steps A10 to A16.

By studying the process described above, the present inventors discovered the problem of an increased burden on staff when an mDL is issued, and devised a means to solve the problem.

That is, the present inventors devised a means to automate the identity verification indicated as step A13 and thereby reduce the burden placed on staff. As a result, it is possible to automate identity verification and thereby reduce the burden placed on staff when issuing an mDL.

Several example embodiments of the present invention are described below with reference to the drawings. Note that in the drawings described below, elements with the same or corresponding functions have been assigned the same reference numerals, and duplicated description thereof may be omitted.

Example Embodiments

The configuration including a mobile driver's license issuing apparatus 10 according to an example embodiment will now be described using FIG. 3. FIG. 3 depicts one example of a system including a mobile driver's license issuing apparatus.

[System Configuration]

The system 100 includes at least the mobile driver's license issuing apparatus 10, a driver's license information storage device 20, and a mobile device 30.

The mobile driver's license issuing apparatus 10 includes at least an imaging device 13, a reader device 14, an issuing permission determining unit 15, a confirming unit 11, and an issuing unit 12. The mobile driver's license issuing apparatus 10 is an apparatus that automates identity verification and thereby reduces the burden on staff involved in mDL tasks.

As examples, the mobile driver's license issuing apparatus 10 is an information processing apparatus such as a CPU (Central Processing Unit), a programmable device such as an FPGA (Field-Programmable Gate Array), a GPU (Graphics Processing Unit), a circuit on which any one of such devices are mounted, a computer, or a kiosk terminal.

The driver's license information storage device 20 is a storage device that stores information relating to the driver's licenses of a plurality of driver's license holders. The driver's license information storage device 20 is a database, a server computer, a circuit including a memory, or the like. The driver's license information storage device 20 and the mobile driver's license issuing apparatus 10 are connected by a dedicated line.

The driver's license information may store, in addition to facial photo information, one or more types of biometric information (or "supplementary biometric information") of the driver's license holder, such as an iris, fingerprint, palm print, finger veins, or otoacoustics.

As examples, the mobile device 30 is an information processing apparatus, such as a smartphone or a tablet, which is owned by the applicant and is equipped with one or more of a CPU, a programmable device such as an FPGA, and a GPU.

An IC-based driver's license 40 has personal information written on a surface of a card, and the same content as this personal information is stored in an IC chip mounted on the surface of the card. The IC chip stores at least information that associates a driver's license number with personal information (as one example, information representing a facial photo, name, date of birth, address, and the like).

In addition to the facial photo information, the IC chip may also store one or more types of biometric information (or "supplementary biometric information"), such as an iris, fingerprint, palm print, finger veins, or otoacoustics, of the driver's license holder.

The mobile driver's license issuing apparatus 10 will now be described in more detail.

The imaging device 13 outputs a captured image including the applicant's face to the confirming unit 11. As conceivable examples, the imaging device 13 may be a monocular camera, a compound eye camera, an RGB-D camera, or the like.

Although the imaging device 13 is installed in the mobile driver's license issuing apparatus 10 in the example in FIG. 3, the imaging device 13 may be provided outside the mobile driver's license issuing apparatus 10.

The reader device 14 is a scanner that reads the facial photograph on the surface of the IC-based driver's license 40, or a device that reads personal information, including image data of a facial photograph, stored in the IC chip.

In addition to the reader device 14, a device for acquiring one or more types of biometric information (or "supplementary biometric information") such as an iris, fingerprint, palm print, finger veins, otoacoustics, or the like of the driver's license holder may be provided.

The issuing permission determining unit 15 refers to an issuing permission condition, which is stored in the driver's license information storage device 20, associated with the driver's license number, and used to determine whether to issue a mobile driver's license to the mobile device 30. When the issuing permission condition is satisfied, the issuing permission determining unit 15 outputs an instruction to the confirming unit 11 to execute an identity verification process.

The issuing permission condition is a condition for determining at least that the driver's license of the applicant has not reached its expiry date, has not been revoked, and that the procedures for issuing a mobile driver's license (that is, the procedures in steps A11 and A12) have been completed.

In more detail, first, the issuing permission determining unit 15 acquires personal information related to an acquired driver's license number, validity information, and mDL application completion information from the driver's license information storage device 20.

Next, the issuing permission determining unit 15 refers to expiry date information, revocation information, and mDL application completion information to confirm whether an mDL can be issued. That is, it is determined whether the license is within its expiry date, has not been revoked, and whether the procedures in steps A11 and A12 described earlier have been completed. However, if an application fee is not required, it is unnecessary to determine whether the procedure in Step A12 has been completed.

Next, if the issuing permission condition is satisfied, the issuing permission determining unit 15 outputs an instruction to the confirming unit 11 to execute the identity verification process.

When an instruction has been obtained from the issuing permission determining unit 15, the confirming unit 11 combines, based on combination information that is set in advance, first biometric information of the applicant acquired from the driver's license information storage device 20 connected to a dedicated line, second biometric information produced in real time by image capture of the applicant by the imaging device 13, and third biometric information of the applicant held by the IC-based driver's license owned by the applicant, and executes an identity verification process for each combination.

The dedicated line is a network (or "standalone network") that cannot connect to an external network online. One example of the dedicated line is a stand-alone network installed at a police station or the like.

The reason for using a standalone network is that the first biometric information is personal information and cannot be transferred online for security reasons. Also, from the viewpoint of security, it is better to access the driver's license information storage device 20 via a cable rather than wirelessly.

The first biometric information is information expressing a facial photograph of the applicant (that is, image information) obtained from the driver's license information storage device 20.

The second biometric information is information on a photograph of the applicant's face captured using the imaging device 13 provided in the mobile driver's license issuing apparatus 10.

The third biometric information is information on a facial photo obtained by scanning the facial photo of the applicant printed on the surface of the IC-based driver's license 40, or information on a facial photo of the applicant obtained from the IC chip of the IC-based driver's license 40 (image information).

The expression "combination information" refers to information expressing a combination of the first biometric information and the second biometric information, a combination of the first biometric information and the third biometric information, and a combination of the second biometric information and the third biometric information. Note that it is also possible to perform identity verification using only two combinations out of the three combinations given above.

Regarding the identity verification process, a case will be described where the first biometric information, the second biometric information, and the third biometric information are information on the applicant's face. The confirming unit 11 first calculates a degree of similarity between the two faces in each of the three combinations described above.

To calculate the degree of similarity, feature amounts of each of the first biometric information, the second biometric information, and the third biometric information are first extracted. Next, for each combination, the degree of similarity between the two faces is calculated using the extracted feature amounts.

After this, the confirming unit 11 determines that identity verification has succeeded if each of the three calculated degrees of similarity is greater than a preset threshold. If any one of the calculated degrees of similarity is less than or equal to the preset threshold, it is determined that identity verification has failed. The threshold is determined by experimentation, simulation, or the like.

Although three degrees of similarity are used in the determination described above, as another form of identity verification, it is also possible to determine that identity verification has succeeded if two degrees of similarity are greater than a threshold.

To improve the accuracy of identity verification, it is also possible, as another form of identity verification, to additionally perform an identity verification process using supplementary biometric information related to the first biometric information, supplementary biometric information related to the third biometric information and supplementary biometric information acquired in real time.

If identity verification has succeeded, the issuing unit 12 stores (registers) information, which is mDL information generated based on the driver's license information of the applicant acquired from the driver's license information storage device 20, signature information, and the like, in the storage area of the mobile device 30 owned by the applicant.

In more detail, when an mDL is issued, the applicant first launches the mDL application on the mobile device 30. After this, communication is established between the mobile device 30 and the mobile driver's license issuing apparatus 10.

Once the communication described above has been established, it is determined that the mDL application installed in the mobile device 30 is genuine. As the communication, short distance communication, such as NFC (Near Field Communication: registered trademark), is used for example.

Next, the mDL application uses a biometric authentication function provided in the mobile device 30 to execute a process (or "mobile terminal owner confirmation process") that confirms that the owner of the mobile device 30 is the applicant.

After this, the mDL application transmits an owner confirmation notification indicating that the owner of the mobile device 30 has been confirmed via a communication unit to the mobile driver's license issuing apparatus 10.

Next, after the mobile driver's license issuing apparatus 10 has received the owner confirmation notification via the communication unit, the issuing unit 12 uses the facial photo information (or "first biometric information") included in the driver's license information and a facial photograph captured in real time (or "second biometric information") to calculate a degree of similarity between the first biometric information and the second biometric information.

Next, if the degree of similarity between the first biometric information and the second biometric information is greater than a threshold set in advance, the issuing unit 12 determines that the person in front of the mobile driver's license issuing apparatus 10 is the applicant himself/herself. Note that if the degree of similarity between the first biometric information and the second biometric information is less than or equal to the threshold, the issuing unit 12 determines that the person in front of the mobile driver's license issuing apparatus 10 is not the applicant himself/herself.

After this, the issuing unit 12 transmits an applicant confirmation notification, which indicates that the person in front of the mobile driver's license issuing apparatus 10 is the applicant himself/herself, via the communication unit to the mobile device 30.

Next, when the mobile device 30 has received the applicant confirmation notification via the communication unit, the mDL information is stored in the storage area of the mobile device 30 owned by the applicant.

After the issuing unit 12 has issued the mDL information to the mobile device 30 owned by the applicant and the mDL information has been stored in the storage area of the mobile device 30, mDL issuance completion information indicating that mDL information has been issued is stored in the driver's license information storage device 20 in association with the driver's license information of the applicant.

[Apparatus Operation]

Figure 4:
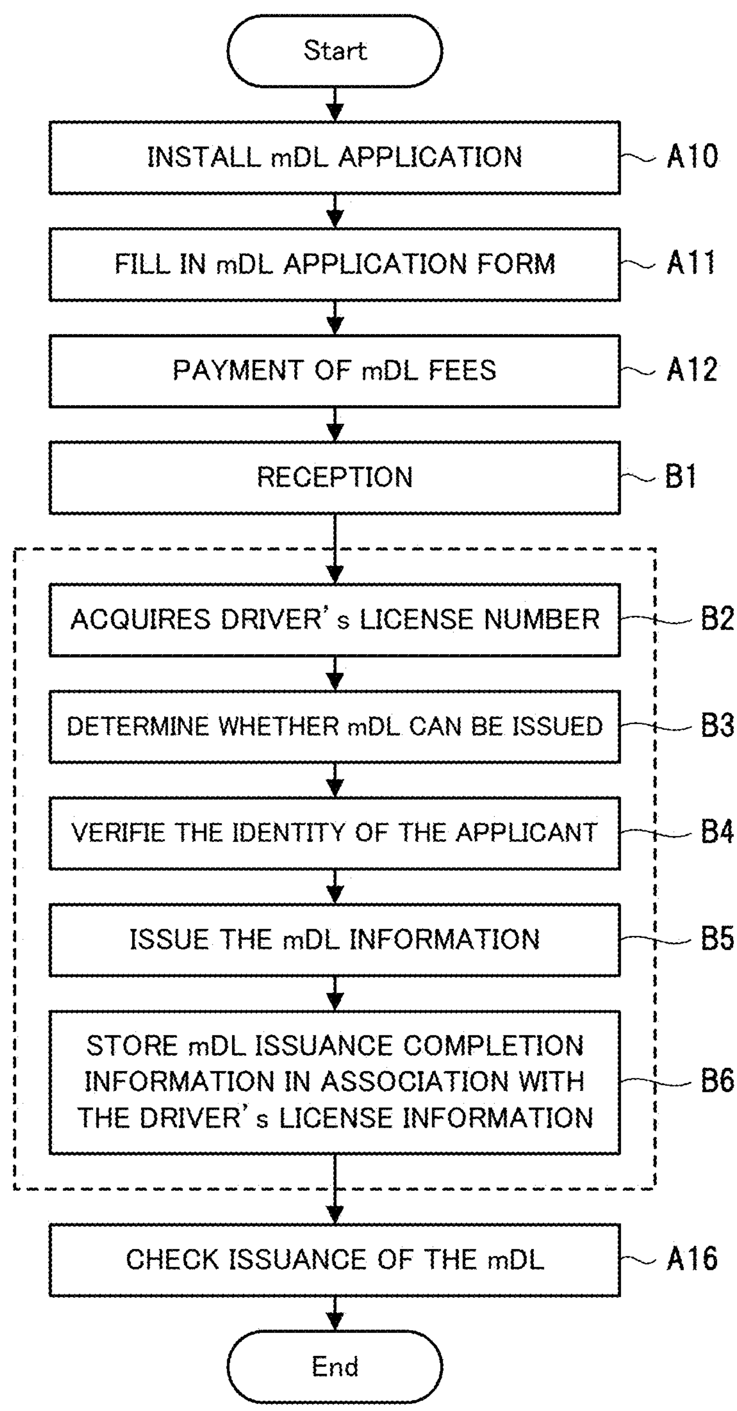
FIG. 4 is a diagram illustrating an example of operations of the mobile driver's license issuing apparatus.

Next, the operation of the mobile driver's license issuing apparatus according to the present example embodiment will be described with reference to FIG. 4. FIG. 4 is a diagram useful in explaining example operations of the mobile driver's license issuing apparatus. The following description refers to the drawings as appropriate. In the present example embodiment, a mobile driver's license issuing method is implemented by operating a mobile driver's license issuing apparatus. Accordingly, a description of the operation of the mobile driver's license issuing apparatus is given below in place of describing a mobile driver's license issuing method according to the present example embodiment.

The procedure for issuing an mDL will be described.

First, when applying for an mDL, the applicant installs an mDL application on the mobile device 30 owned by the applicant (step A10).

Next, the applicant enters the necessary information into the mDL application form (step A11) and pays the mDL application fee to staff at a counter (step A12). However, when an application fee is not required, step A12 is unnecessary.

Next, the applicant registers at the counter, and a staff member uses a terminal device to register mDL application completion information in association with the driver's license information of the applicant stored in the driver's license information storage device (Step B1).

When the procedures from steps A10 to B1 described above have been completed, the mobile driver's license issuing apparatus 10 executes the processing from steps B2 to B6.

The applicant has the reader device 14 provided in the mobile driver's license issuing apparatus 10 read the driver's license number from the IC-based driver's license 40 the applicant possesses. In more detail, the reader device 14 acquires a driver's license number on the card surface of the IC-based driver's license 40 or a driver's license number stored in the IC chip (step B2).

Next, the issuing permission determining unit 15 determines whether an mDL can be issued (step B3). In more detail, in step B3, first, the issuing permission determining unit 15 acquires personal information relating to the acquired driver's license number, validity information, and the mDL application completion information from the driver's license information storage device 20.

After this, in step B3, the issuing permission determining unit 15 refers to the expiry date information, the revocation information, and the mDL application completion information to confirm whether an mDL can be issued. That is, it is determined whether the applicant's license has not reached its expiry date and has not been revoked, and whether the procedures in steps A11 and A12 have been completed. However, if an application fee is not required, a determination regarding the procedure in step A12 is unnecessary.

Next, when it has been determined that an mDL can be issued, the confirming unit 11 combines, based on the combination information set in advance, the first biometric information of the applicant obtained from the driver's license information storage device 20, the second biometric information produced by real-time image capture of the applicant by the imaging device 13, and the third biometric information of the applicant held in the IC-based driver's license the applicant possesses, and executes the identity verification process for each combination (step B4).

If the identity verification has succeeded, the issuing unit 12 transfers information, such as mDL information and signature information generated based on the driver's license information of the applicant obtained from the driver's license information storage device 20, to the mobile device 30 owned by the applicant so that the information is stored in a storage area of the mobile device 30 (step B5).

Next, after the issuing of the mDL information to the storage area of the mobile device 30 has been completed, the issuing unit 12 stores mDL issuance completion information, which indicates that the mDL information has been issued, in association with the driver's license information of the applicant in the driver's license information storage device 20 (step B6).

After this, the applicant uses the mobile device 30 to check the content of the issued mDL (step A16).

Effects of Example Embodiment

In this way, according to the present example embodiment, by automating identity verification, it is possible to reduce the burden on staff when issuing an mDL. In addition, by checking combinations of information, it is possible to enact countermeasures such as preventing another person from impersonating the applicant and preventing fraudulent procedures using a lost IC-based driver's license.

[Program]

The program according to the example embodiment may be a program that causes a computer to execute steps B2 to B6 shown in FIG. 4. By installing this program in a computer and executing the program, the mobile driver's license issuing apparatus and the mobile driver's license issuing method according to the example embodiment can be realized. In this case, the processor of the computer performs processing to function as the issuing permission determining unit 15, the confirming unit 11, and the issuing unit 12.

Also, the program according to the example embodiment may be executed by a computer system constructed by a plurality of computers. In this case, for example, each computer may function as any of the issuing permission determining unit 15, the confirming unit 11, and the issuing unit 12.

[Physical Configuration]

Figure 5:
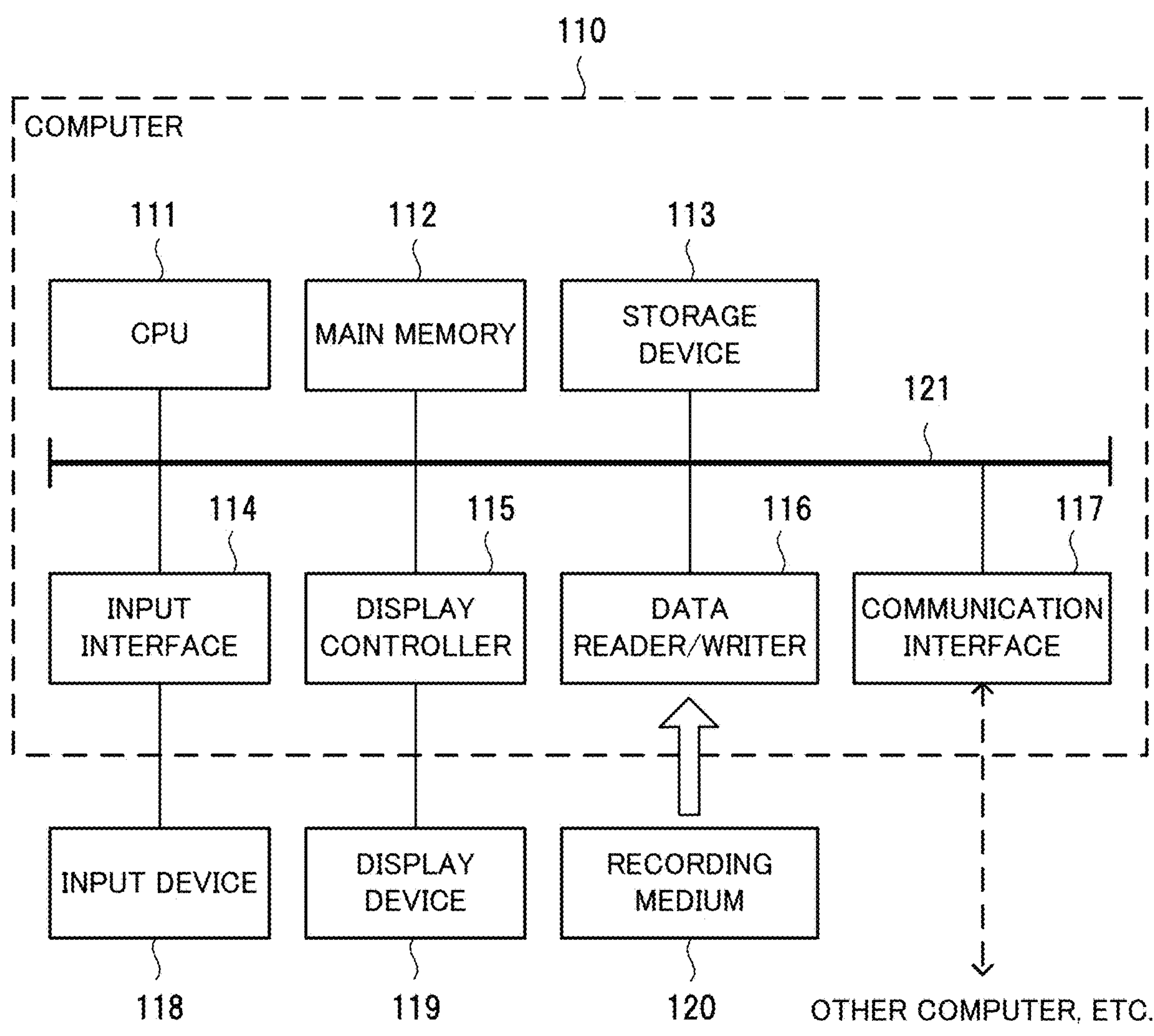
FIG. 5 is a diagram illustrating an example of a computer that realizes the mobile driver's license issuing apparatus in the example embodiment.

Here, a computer that realizes the mobile driver's license issuing apparatus by executing the program according to an example embodiment will be described with reference to FIG. 5. FIG. 5 is a diagram illustrating an example of a computer that realizes the mobile driver's license issuing apparatus in the example embodiment.

As shown in FIG. 5, a computer 110 includes a CPU (Central Processing Unit) 111, a main memory 112, a storage device 113, an input interface 114, a display controller 115, a data reader/writer 116, and a communications interface 117. These units are each connected so as to be capable of performing data communications with each other through a bus 121. Note that the computer 110 may include a GPU (Graphics Processing Unit) or an FPGA (Field-Programmable Gate Array) in addition to the CPU 111 or in place of the CPU 111.

The CPU 111 opens the program (code) according to this example embodiment, which has been stored in the storage device 113, in the main memory 112 and performs various operations by executing the program in a predetermined order. The main memory 112 is typically a volatile storage device such as a DRAM (Dynamic Random Access Memory). Also, the program according to this example embodiment is provided in a state being stored in a computer-readable recording medium 120. Note that the program according to this example embodiment may be distributed on the Internet, which is connected through the communications interface 117. Note that the computer-readable recording medium 120 is a non-volatile recording medium.

Also, other than a hard disk drive, a semiconductor storage device such as a flash memory can be given as a specific example of the storage device 113. The input interface 114 mediates data transmission between the CPU 111 and an input device 118, which may be a keyboard or mouse. The display controller 115 is connected to a display device 119, and controls display on the display device 119.

The data reader/writer 116 mediates data transmission between the CPU 111 and the recording medium 120, and executes reading of a program from the recording medium 120 and writing of processing results in the computer 110 to the recording medium 120. The communications interface 117 mediates data transmission between the CPU 111 and other computers.

Also, general-purpose semiconductor storage devices such as CF (Compact Flash (registered trademark)) and SD (Secure Digital), a magnetic recording medium such as a Flexible Disk, or an optical recording medium such as a CD-ROM (Compact Disk Read-Only Memory) can be given as specific examples of the recording medium 120.

Also, instead of a computer in which a program is installed, the mobile driver's license issuing apparatus according to this example embodiment can also be realized by using hardware corresponding to each unit. Furthermore, a portion of the mobile driver's license issuing apparatus may be realized by a program, and the remaining portion realized by hardware.

Supplementary Notes

Furthermore, the following supplementary notes are disclosed regarding the example embodiments described above. Some portion or all of the example embodiments described above can be realized according to (supplementary note 1) to (supplementary note 12) described below, but the below description does not limit the present invention.

(Supplementary Note 1)

A mobile driver's license issuing apparatus comprising:

confirming unit that combis, based on combination information set in advance, first biometric information of an applicant that has been stored in advance in a driver's license information storage device connected to a dedicated line, second biometric information acquired by real-time image capture of the applicant, and third biometric information of the applicant held by an integrated circuit (IC)-based driver's license owned by the applicant, and for executing an identity verification process on each combination; and issuing unit that issues, when identity verification has succeeded, mobile driver's license information, which has been generated based on driver's license information of the applicant acquired from the driver's license information storage device, to a terminal owned by the applicant so as to store the mobile driver's license information in a storage area of the terminal.

(Supplementary Note 2)

The mobile driver's license issuing apparatus according to supplementary note 1, further comprising issuing permission determining unit that refers to an issuing permission condition, which is stored in the driver's license information storage device, associated with a driver's license number of the driver's license, and used to determine whether issuing to the terminal of the mobile driver's license information is permitted, and for executing the identity verification process when the issuing permission condition is satisfied.

(Supplementary Note 3)

The mobile driver's license issuing apparatus according to supplementary note 2, wherein the issuing permission condition is information for determining at least whether the driver's license is yet to reach an expiry date, whether the driver's license has not been revoked, and whether an issuing procedure for a mobile driver's license has been completed.

(Supplementary Note 4)

The mobile driver's license issuing apparatus according to supplementary note 3, wherein the issuing unit stores, after issuing of the mobile driver's license information to a storage area of the terminal owned by the applicant has been completed, information indicating that the mobile driver's license information has been issued in the driver's license information storage device so as to be associated with the first biometric information of the applicant.

(Supplementary Note 5)

A mobile driver's license issuing method executed by a computer comprising:

combining, based on combination information set in advance, first biometric information of an applicant that has been stored in advance in a driver's license information storage device connected to a dedicated line, second biometric information acquired by real-time image capture of the applicant, and third biometric information of the applicant held by an integrated circuit (IC)-based driver's license owned by the applicant, and executing an identity verification process on each combination; and issuing, when identity verification has succeeded, mobile driver's license information, which has been generated based on driver's license information of the applicant acquired from the driver's license information storage device, to a terminal owned by the applicant so as to store the mobile driver's license information in a storage area of the terminal.

(Supplementary Note 6)

The mobile driver's license issuing method according to supplementary note 5, further comprising the computer referring to an issuing permission condition, which is stored in the driver's license information storage device, associated with a driver's license number of the driver's license, and used to determine whether issuing to the terminal of the mobile driver's license information is permitted, and executing the identity verification process when the issuing permission condition is satisfied.

(Supplementary Note 7)

The mobile driver's license issuing method according to supplementary note 6, wherein the issuing permission condition is information for determining at least whether the driver's license is yet to reach an expiry date, whether the driver's license has not been revoked, and whether an issuing procedure for a mobile driver's license has been completed.

(Supplementary Note 8)

The mobile driver's license issuing method according to supplementary note 7, wherein the computer stores, after issuing of the mobile driver's license information to a storage area of the terminal owned by the applicant has been completed, information indicating that the mobile driver's license information has been issued in the driver's license information storage device so as to be associated with the first biometric information of the applicant.

(Supplementary Note 9)

A computer readable recording medium that includes a program recorded thereon, the program including instructions that cause a computer to carry out:

combining, based on combination information set in advance, first biometric information of an applicant that has been stored in advance in a driver's license information storage device connected to a dedicated line, second biometric information acquired by real-time image capture of the applicant, and third biometric information of the applicant held by an integrated circuit (IC)-based driver's license owned by the applicant, and executing an identity verification process on each combination; and issuing, when identity verification has succeeded, mobile driver's license information, which has been generated based on driver's license information of the applicant acquired from the driver's license information storage device, to a terminal owned by the applicant so as to store the mobile driver's license information in a storage area of the terminal.

(Supplementary Note 10)

The computer readable recording medium according to supplementary note 9, further comprising an instruction causing the computer to refer to an issuing permission condition, which is stored in the driver's license information storage device, associated with a driver's license number of the driver's license, and used to determine whether issuing to the terminal of the mobile driver's license information is permitted and to execute the identity verification process when the issuing permission condition is satisfied.

(Supplementary Note 11)

The computer readable recording medium according to supplementary note 10, wherein the issuing permission condition is information for determining at least whether the driver's license is yet to reach an expiry date, whether the driver's license has not been revoked, and whether an issuing procedure for a mobile driver's license has been completed.

(Supplementary Note 12)

The computer readable recording medium according to supplementary note 11, further comprising an instruction causing the computer to store, after issuing of the mobile driver's license information to a storage area of the terminal owned by the applicant has been completed, information indicating that the mobile driver's license information has been issued in the driver's license information storage device so as to be associated with the first biometric information of the applicant.

Although the present invention of this application has been described with reference to exemplary embodiments, the present invention is not limited to the above exemplary embodiments. Within the scope of the present invention of this application, various changes that can be understood by those skilled in the art can be made to the configuration and details of the present invention of this application.

INDUSTRIAL APPLICABILITY

As described above, by automating identity verification, it is possible to reduce the burden on staff members when issuing mobile driver's license. In addition, the invention is useful in a field where the issuing of mobile driver's license is required.

REFERENCE SIGNS LIST

10 Mobile driver's license issuing apparatus
11 Confirming unit
12 Issuing unit
13 Imaging device
14 Reader device
15 Issuing permission determining unit
20 Driver's license information storage device
30 Mobile device
40 IC-based driver's license
110 Computer
111 CPU
112 Main memory
113 Storage device
114 Input interface
115 Display controller
116 Data reader/writer
117 Communications interface
118 Input device
119 Display device
120 Recording medium
121 Bus

What is claimed is:

1. A mobile driver's license issuing apparatus comprising:

at least one memory storing instructions; and at least one processor configured to execute the instructions to:

based on combination information set in advance, first biometric information of an applicant that has been stored in advance in a driver's license information storage device connected to a dedicated line, second biometric information acquired by real-time image capture of the applicant, and third biometric information of the applicant held by an integrated circuit (IC)-based driver's license owned by the applicant, as an identity verification process, use a combination of the first biometric information and the second biometric information, a combination of the first biometric information and the third biometric information, and a combination of the second biometric information and the third biometric information, to calculate degrees of similarity for each combination;

when each of the calculated degrees of similarity is greater than a predetermined threshold, determine that the identity verification process has been successful; and when the identity verification process has succeeded, issue mobile driver's license information, which has been generated based on driver's license information of the applicant acquired from the driver's license information storage device and signature information, to a terminal owned by the applicant so as to store the mobile driver's license information in a storage area of the terminal.

2. The mobile driver's license issuing apparatus according to claim 1, wherein the at least one processor is configured to execute the instructions to:

refer to an issuing permission condition, which is stored in the driver's license information storage device, associated with a driver's license number of the driver's license, and used to determine whether issuing to the terminal of the mobile driver's license information is permitted, and for executing the identity verification process when the issuing permission condition is satisfied.

3. The mobile driver's license issuing apparatus according to claim 2, wherein the issuing permission condition is information for determining at least whether the driver's license is yet to reach an expiry date, whether the driver's license has not been revoked, and whether an issuing procedure for a mobile driver's license has been completed.

4. The mobile driver's license issuing apparatus according to claim 3, wherein the at least one processor is configured to execute the instructions to:

in a case where an owner confirmation notification indicating that an owner of the terminal has been confirmed is received, further calculate a degree of similarity between the first biometric information and the second biometric information captured in real time, determine that a person in front of the mobile driver's license issuing apparatus is the applicant when the calculated degree of similarity is greater than a predetermined threshold value, and transmit an applicant confirmation notification to the terminal; and after issuing of the mobile driver's license information to the storage area of the terminal owned by the applicant has been completed, store information indicating that the mobile driver's license information has been issued in the driver's license information storage device so as to be associated with the first biometric information of the applicant.

5. A mobile driver's license issuing method executed by a computer, the method comprising:

based on combination information set in advance, first biometric information of an applicant that has been stored in advance in a driver's license information storage device connected to a dedicated line, second biometric information acquired by real-time image capture of the applicant, and third biometric information of the applicant held by an integrated circuit (IC)-based driver's license owned by the applicant, executing an identity verification process using a combination of the first biometric information and the second biometric information, a combination of the first biometric information and the third biometric information, and a combination of the second biometric information and the third biometric information, to calculate degrees of similarity for each combination;

when each of the calculated degrees of similarity is greater than a predetermined threshold, determine that the identity verification process has been successful; and when the identity verification process has succeeded, issuing mobile driver's license information, which has been generated based on driver's license information of the applicant acquired from the driver's license information storage device and signature information, to a terminal owned by the applicant so as to store the mobile driver's license information in a storage area of the terminal.

6. The mobile driver's license issuing method according to claim 5, further comprising:

referring to an issuing permission condition, which is stored in the driver's license information storage device, associated with a driver's license number of the driver's license, and used to determine whether issuing to the terminal of the mobile driver's license information is permitted, and executing the identity verification process when the issuing permission condition is satisfied.

7. The mobile driver's license issuing method according to claim 6, wherein the issuing permission condition is information for determining at least whether the driver's license is yet to reach an expiry date, whether the driver's license has not been revoked, and whether an issuing procedure for a mobile driver's license has been completed.

8. The mobile driver's license issuing method according to claim 7, in a case where an owner confirmation notification indicating that an owner of the terminal has been confirmed is received, further calculating a degree of similarity between the first biometric information and the second biometric information captured in real time, determining that a person in front of a mobile driver's license issuing apparatus is the applicant when the calculated degree of similarity is greater than a predetermined threshold value, and transmitting an applicant confirmation notification to the terminal; and after issuing of the mobile driver's license information to the storage area of the terminal owned by the applicant has been completed, storing information indicating that the mobile driver's license information has been issued in the driver's license information storage device so as to be associated with the first biometric information of the applicant.

9. A non-transitory computer readable recording medium that includes a program recorded thereon, the program including instructions, which when executed by at least one processor cause the at least one processor to execute a mobile driver's license issuing method, the method comprising:

based on combination information set in advance, first biometric information of an applicant that has been stored in advance in a driver's license information storage device connected to a dedicated line, second biometric information acquired by real-time image capture of the applicant, and third biometric information of the applicant held by an integrated circuit (IC)-based driver's license owned by the applicant, executing an identity verification process using a combination of the first biometric information and the second biometric information, a combination of the first biometric information and the third biometric information, and a combination of the second biometric information and the third biometric information, to calculate degrees of similarity for each combination;

when each of the calculated degrees of similarity is greater than a predetermined threshold, determining that the identity verification process has been successful; and when the identity verification process has succeeded, issuing mobile driver's license information, which has been generated based on driver's license information of the applicant acquired from the driver's license information storage device and signature information, to a terminal owned by the applicant so as to store the mobile driver's license information in a storage area of the terminal.

10. The non-transitory computer readable recording medium according to claim 9, wherein the method further comprises:

referring to an issuing permission condition, which is stored in the driver's license information storage device, associated with a driver's license number of the driver's license, and used to determine whether issuing to the terminal of the mobile driver's license information is permitted and to execute the identity verification process when the issuing permission condition is satisfied.

11. The non-transitory computer readable recording medium according to claim 10, wherein the issuing permission condition is information for determining at least whether the driver's license is yet to reach an expiry date, whether the driver's license has not been revoked, and whether an issuing procedure for a mobile driver's license has been completed.

12. The non-transitory computer readable recording medium according to claim 11, further comprising in a case where an owner confirmation notification indicating that an owner of the terminal has been confirmed is received, further calculating a degree of similarity between the first biometric information and the second biometric information captured in real time, determining that a person in front of a mobile driver's license issuing apparatus is the applicant when the calculated degree of similarity is greater than a predetermined threshold value, and transmitting an applicant confirmation notification to the terminal; and after issuing of the mobile driver's license information to the storage area of the terminal owned by the applicant completed, storing information indicating that the mobile driver's license information has been issued in the driver's license information storage device so as to be associated with the first biometric information of the applicant.

* * * * *